United States Patent [19]

Vogt et al.

[11] Patent Number: 4,598,008
[45] Date of Patent: Jul. 1, 1986

[54] SANDWICH COMPONENT FOR THE BODYWORK OF A MOTOR VEHICLE

[75] Inventors: Hans Vogt, Overath; Erwin Spiegel, Bergheim, both of Fed. Rep. of Germany

[73] Assignee: Ford Motor Company, Dearborn, Mich.

[21] Appl. No.: 681,035

[22] Filed: Dec. 12, 1984

[30] Foreign Application Priority Data

Dec. 16, 1983 [DE] Fed. Rep. of Germany ....... 3345576

[51] Int. Cl.⁴ .............................................. B32B 3/12
[52] U.S. Cl. .................................... 428/117; 428/138; 428/156; 428/192
[58] Field of Search ............... 428/116, 117, 118, 138, 428/156, 192

[56] References Cited

U.S. PATENT DOCUMENTS

| | | | |
|---|---|---|---|
| 2,742,387 | 4/1956 | Giuliani | 156/224 X |
| 3,211,253 | 10/1965 | Gonzalez | 428/116 X |
| 3,249,659 | 5/1966 | Voelker | 428/116 X |
| 3,483,614 | 12/1969 | Kazimi | 428/117 X |
| 3,658,974 | 4/1972 | Scholl | 428/116 X |
| 3,940,891 | 3/1976 | Slysh | 428/116 X |
| 4,205,927 | 6/1980 | Simmons | 428/116 X |
| 4,344,995 | 8/1982 | Hammer | 428/116 X |
| 4,370,372 | 1/1983 | Higgins et al. | 428/117 X |

FOREIGN PATENT DOCUMENTS

2934430 3/1981 Fed. Rep. of Germany ...... 428/116

*Primary Examiner*—Henry F. Epstein
*Attorney, Agent, or Firm*—Daniel M. Stock; Clifford L. Sadler

[57] ABSTRACT

In a sandwich component, in particular for hoods, deck lids or the like, for the bodywork of a motor vehicle, comprising a core layer interposed between covering layers and a reinforcement member adjacent which the core layer is recessed and which is joined to the covering layers and the core layer by means of plastic foam, the reinforcement member being made dish-shaped and provided with a base having openings and with a projecting flange having openings, and the flange being adjacent to one covering layer from the inside and the base being adjacent to the other covering layer from the inside.

4 Claims, 6 Drawing Figures

SANDWICH COMPONENT FOR THE BODYWORK OF A MOTOR VEHICLE

BACKGROUND OF THE INVENTION

1. Field of the Invention

The invention relates to a sandwich component, in particular a hood, deck lid or the like, for the bodywork of a motor vehicle, of the type having a core layer interposed between covering layers and a reinforcement member, the core layer being recessed in the region of the reinforcement member, and the reinforcement member being joined to the covering layers and the core layer by plastic foam.

2. Description of the Prior Art

The German Offenlegungsschrift (Laid-Open Specification) No. 29 34 430 discloses a sandwich component with a reinforcement member which is joined directly to the core layer and which extends beyond the lower covering layer of the component.

Accordingly, the reinforcement member projects substantially beyond the plane of the sandwich component so that, for example, for engagement of a hinge arrangement with the reinforcement member, a considerable structural space is required. In addition, the arrangement of reinforcement members of this type on the outside of a sandwich component is not desirable because of the unsatisfactory effect on vehicle styling.

SUMMARY OF THE INVENTION

The object of the invention is to provide an improved reinforced sandwich component for motor vehicle bodywork in such a way that the reinforcement member for the sandwich component does not require any additional structural space and is arranged so unobtrusively that it may even be used on the outside of the bodyworks of motor vehicles.

This object is attained according to the invention in that a sandwich component is provided in which the reinforcement member is dish-shaped and has a base and a projecting flange which are secured to the covering layers at locations interior to the sandwich component.

According to another feature of the invention, the projecting flange of the reinforcement member is overlapped by edge areas of the core layer, the base being overlapped by a core layer filler, and strips of reactable polyurethane foam are positioned in the overlapped areas.

By virtue of the fact that the reinforcement member is made dish-shaped and comprises a base provided with openings and a flange provided with openings, the flange being adjacent to one covering layer from the inside and the base being adjacent to the other covering layer from the inside, an arrangement of the reinforcement member is attained in which it is not immediately detectable from the outside of the sandwich component. The reinforcement member is accessible, when required, by local removal of the covering layer adjacent to the base of the reinforcement member. This is particularly advantageous if special fastening devices have to be provided. Such devices, however, are only required in certain cases depending upon the equipment variations of the bodywork of a motor vehicle.

By virtue of the fact that the projecting flange of the reinforcement member is overlaid by edge areas of the core layer, a good bonding of the reinforcement member into the sandwich component is ensured.

If a reinforcement member is required, for example, to receive a hinge arrangement, the base of the reinforcement member may be provided with local raised portions in the region of fastening seats, which project directly through the covering layer.

In this connection, the base of the reinforcement member may be provided with threaded sleeves, welded nuts or cage nuts in the region of the fastening seats.

BRIEF DESCRIPTION OF THE DRAWINGS

The invention is explained in greater detail with reference to one examplary embodiment illustrated in the accompanying drawings, in which.

DESCRIPTION OF A PREFERRED EMBODIMENT

Figure 1:
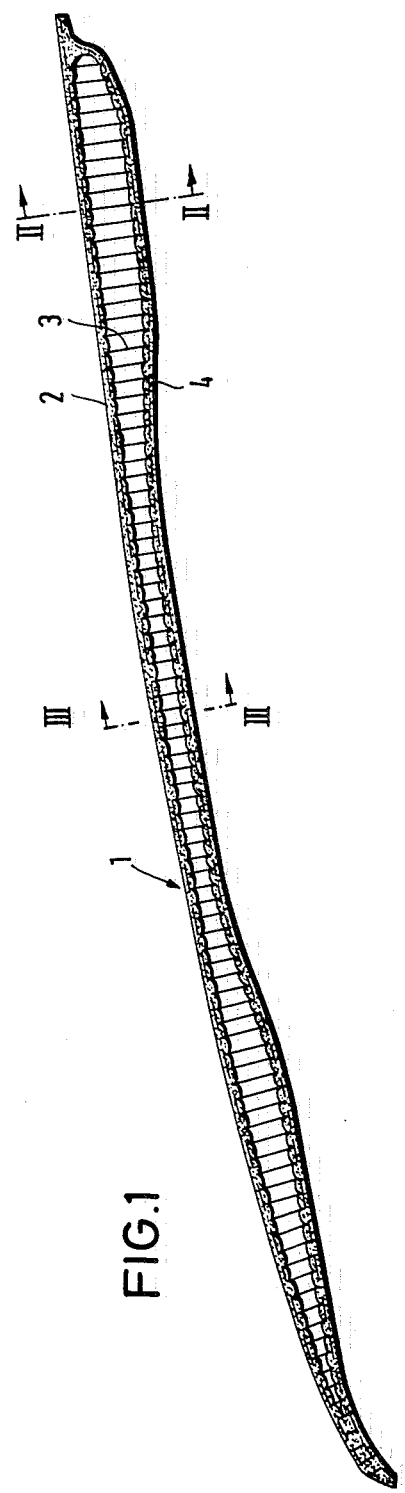
FIG. 1 is a vertical longitudinal section through an engine hood—in the form of a sandich component—of a motor vehicle.
Figure 2:
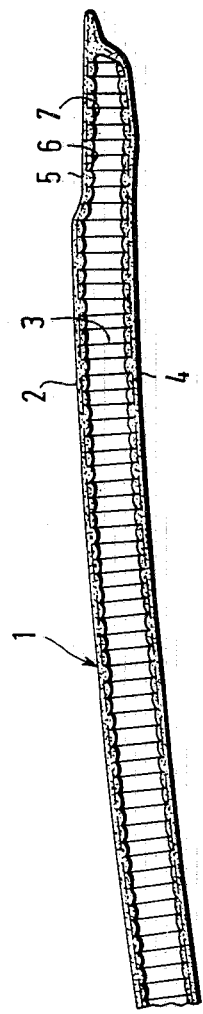
FIG. 2 is a vertical cross-section through the engine hood in FIG. 1 along the line II—II.

A motor vehicle engine hood in the form of a sandwich component 1 is shown in FIGS. 1 and 2. The sandwich component 1 comprises an outer covering layer 2, a core layer 3 and an inner covering layer 4.

The two covering layers 2 and 4 may be formed, for example, by a sheet of PVC 5. The outside of the covering layers may be arranged as desired or may be lacquered or otherwise coated, and the inside is provided with a layer of a reactable glass fibrefilled polyurethane foam 7 connected through an intermediate gel layer 6. The core layer 3 may preferably consist of a honeycomb arrangement of paper, cardboard, plastic material or aluminum, and may vary in thickness in places.

Very different sandwich constructions with different covering layers and different core layers are also possible, of course.

Figure 3:
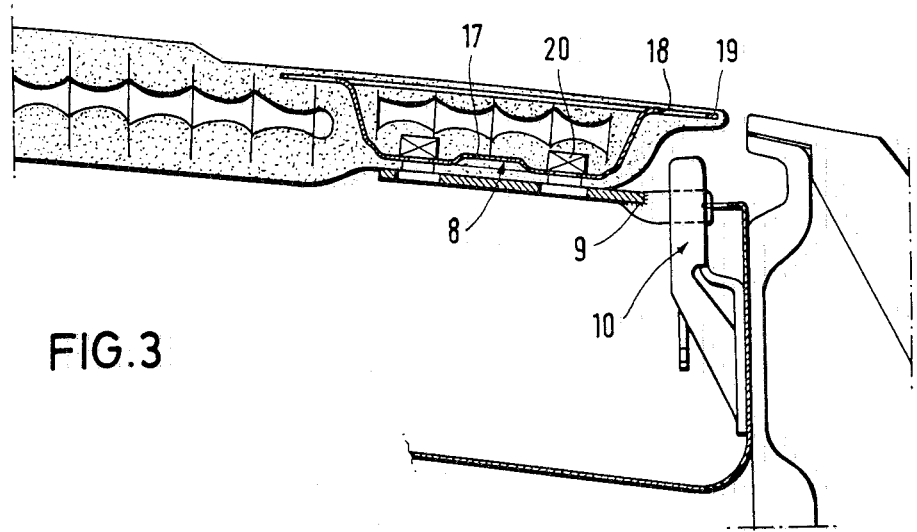
FIG. 3 is a vertical cross-section through part of FIG. 1 along the line III—III.
Figure 4:
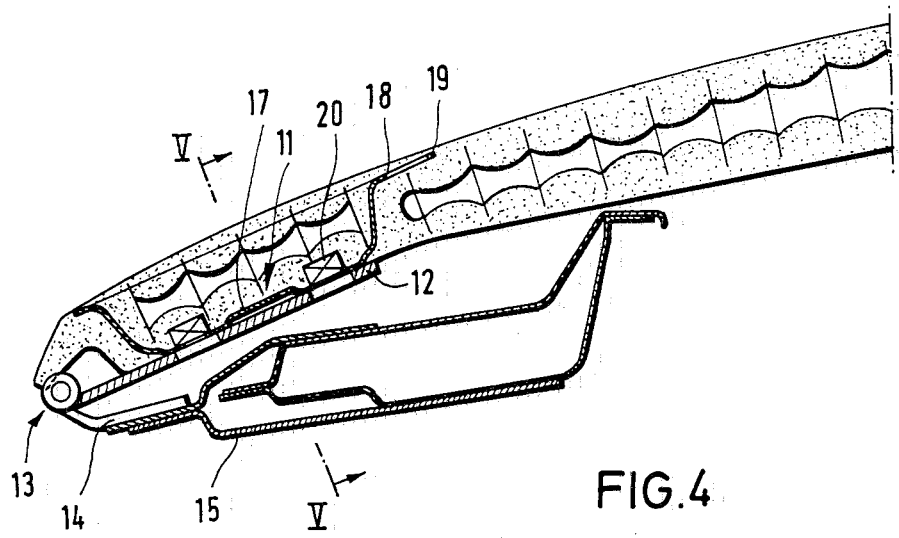
FIG. 4 is a vertical partial longitudinal section through the engine hood according to FIG. 1 in the region of a reinforcement member for a hinge arrangement.

The invention relates essentially to the arrangement of necessary reinforcement members of metal, as required on an engine hood in the area indicated in FIGS. 3 and 4.

In this connection, a reinforcement member 8 for receiving a locking bolt 9 for a hood lock 10 is shown in FIG. 3, while FIG. 4 shows a reinforcement member 11 for receiving one stop member 12 of a hood hinge arrangement 13, the other stop member 14 of which may be secured to sheet metal members 15 of the bodywork of the motor vehicle in conventional manner.

Figure 5:
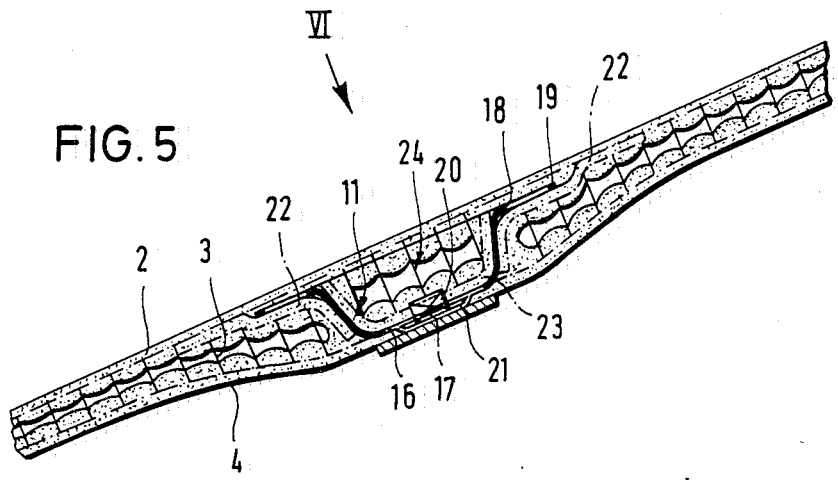
FIG. 5 is a perpendicular cross-section through the region in FIG. 4 along the line V—V.
Figure 6:
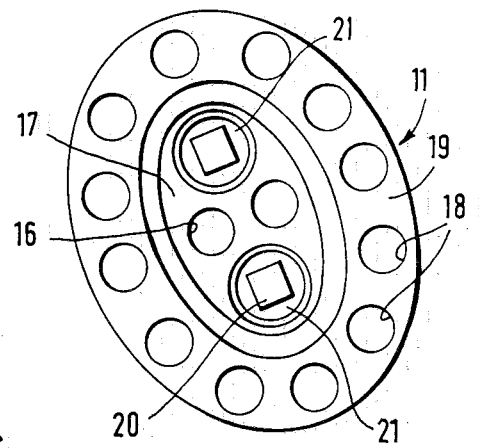
FIG. 6 is a view of the reinforcement member in the direction of the arrow VI in FIG. 5.

As may be seen in FIGS. 3 and 4 in conjunction with FIGS. 5 and 6, the reinforcement members 8 and 11 each have a dish shape which in the illustrated embodiment is essentially elliptical, but for other applications may have a round or divergent polygonal shape. The reinforcement members 8 and 11 have a base 17 provided with openings 16 and a flange 19 projecting at the top and provided with openings 18.

Fastening seats 20, in the present case in the form of punched nuts, are provided on the base 17. In this connection, in the region of the fastening seats 20, the base 17 may be provided with raised portions 21 which project through the covering layer 4.

The fastening seats may, of course, be in the form of widely differing arrangements, such as for example threaded sleeves, welded, stamped and cage nuts or bayonet and catch fastenings.

Where a sandwich component is produced according to the invention, a covering layer of suitable size is inserted in a mold and the reinforcement members 8 and 11 with their projecting flanges 19 are then precisely positioned on the places provided for this. After that, a suitably prepared core layer 3 is laid on top, the layer 3 being cut out in the region of the reinforcement members 8 and 11 only to the extent that the areas of the core layer 3 adjacent to the dish-shaped part of the reinforcement members 8 and 11 rests against the projecting flanges 19 of the reinforcement members 8 and 11, there being interposed a strip 22 of reactable polyurethane foam 7. A suitable core layer filler 24 provided with a strip 23 of reactable polyurethane foam 7 is then inserted and a corresponding further covering layer 4 is laid thereon. After this, the entire sandwich arrangement is subjected to a certain degree of pressure by a mold cover being placed thereon and is permanentely joined by the application of heat; i.e., the layer of glass fibre-filled reactable polyurethane foam 7 produces a secure joint between the covering layers 2 and 4 and the core layer 3 and the reinforcement members 8 and 11.

When the sandwich component is removed from the mold after the appropriate hardening time, it is immediately ready for use and has no troublesome projecting reinforcement members. Access to the fastening seats of the reimforcement members 8 and 11 may be had by cutting free the corresponding areas of the covering layers. These layers, however, may be provided beforehand in the second covering layer and correspond to the raised portions provided in the exemplary of embodiment.

It may easily be seen that, by virtue of the fact that the projecting flange of the reinforcement members adjoins one covering layer on the one hand and is overlapped by areas of the core layer on the other hand, a secure fastening of one plane of the reinforcement members is attained, while by virtue of the fact that the bases of the reinforcement members bear directly on the other layer, an equally secure fastening in the other plane of the reinforcement members is ensured.

What is claimed is:

1. A sandwich component, in particular for hoods, deck lids or the like, for the bodywork of a motor vehicle, the sandwich component being of the type comprising a core layer interposed between a pair of covering layers, and a reinforcement member, the core layer being recessed adjacent the reinforcement member, and the reinforcement member being joined to the covering layers and the core layer by means of plastic foam, characterized in that the reinforcement member is made dish-shaped and comprises a base provided with openings and a projecting flange provided with openings and the flange is positioned inwardly adjacent to one covering layer and the base is inwardly adjacent to the other covering layer.

2. A sandwich component according to claim 1, characterized in that the reinforcement member is overlapped on its projecting flange by edge areas of the core layer and has interposed therebetween strips of reactable polyurethane foam and is overlapped on its base by a core layer filled provided with a corresponding strip of reactable polyurethane foam.

3. A sandwich component according to claims 1 or 2, characterized in that on its base there are provided seats for receiving fastener members and local raised portions adjacent the seats which project through the other covering layer.

4. A sandwich component according to claim 3, characterized in that on the inside of its base in the region of the fastening seats, the reinforcement member is provided with threaded sleeves or welded, punched or cage nuts.

* * * * *